July 18, 1933. P. S. JUDY 1,918,756
APPARATUS FOR CLEANING THE FILTER BED OF A WELL
Filed May 25, 1932
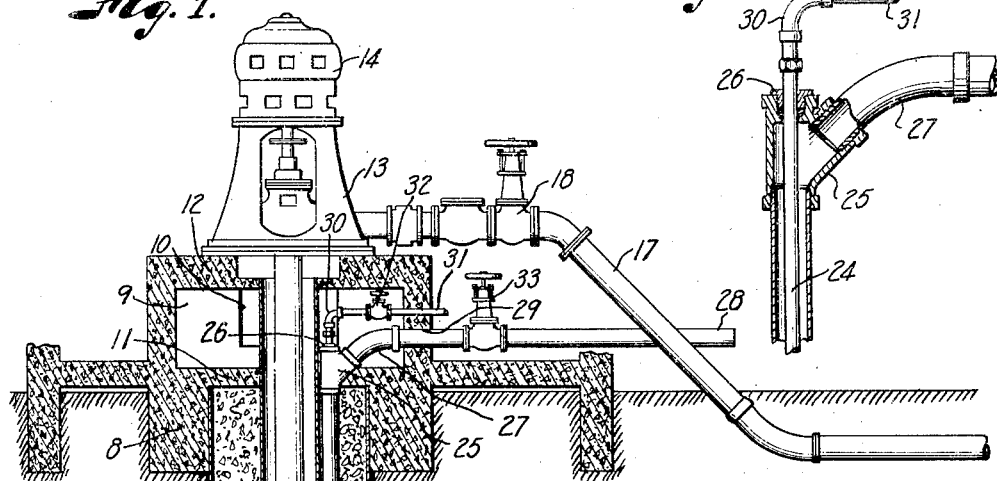
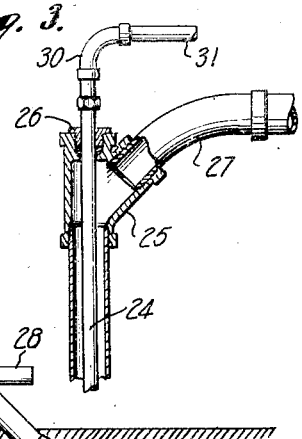
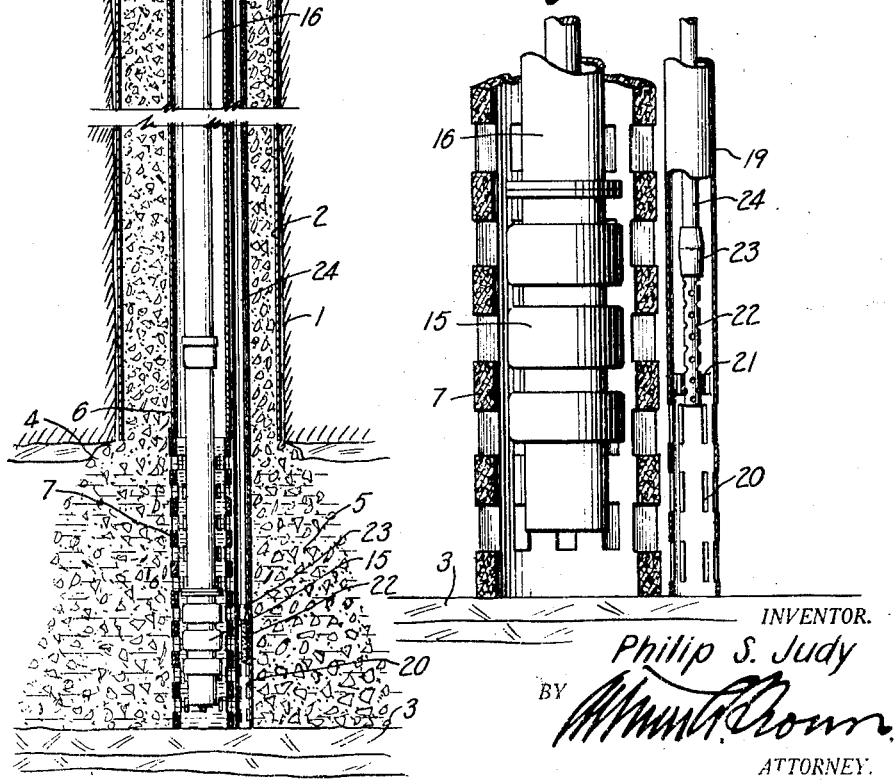
INVENTOR.
Philip S. Judy
BY
ATTORNEY.

Patented July 18, 1933

1,918,756

UNITED STATES PATENT OFFICE

PHILIP S. JUDY, OF KANSAS CITY, MISSOURI

APPARATUS FOR CLEANING THE FILTER BED OF A WELL

Application filed May 25, 1932. Serial No. 613,433.

My invention relates to wells and more particularly to a method of and apparatus for removing sand or silt from the filter bed of a well.

The present application pertains particularly to that type of well wherein a porous wall of gravel or similar material surrounds the well casing for filtering liquid entering the lower end of the casing. Flow from the liquid bearing strata through the porous bed into the casing tends to carry finer particles such as sand and silt toward the casing screen and eventually a layer of silt builds up around the screen to the extent that the flow of fluid into the casing will be seriously obstructed or even prevented. It then becomes necessary to effect removal of this layer of fine material so that pumping of liquid from the well can again be resumed.

In previous practice, air or fluid pressure has been released into the upper end of the casing to force the silt layer back into and through the interstices of the gravel bed, but obviously, such method of ridding the intake end of the casing from the substantially impervious silt layer can be only temporary in its results, since the particles of sand, etc., will gradually be returned to the casing and require a repetition of the above process.

It is, therefore, the principal object of my invention to provide apparatus with which it is possible to remove much of the collected layer of silt from the well through means independent of the regular discharge of liquid so that the liquid in the well will not become unnecessarily contaminated and the silt cannot again interfere with well pumping operations, but its removal from the well will increase the capacity of the filter or gravel bed so that more filtering material may be added thereto.

In accomplishing this and other objects of my invention, I have provided improved details of structure the preferred form of which is illustrated in the accompanying drawing, wherein:

Fig. 1 is a central vertical section of a well provided with pumping apparatus shown in elevation, and equipped with silt-removing means embodying my invention and shown partly in section.

Fig. 2 is a central vertical section of the lower end of a discharge conduit positioned adjacent a well screen, a pressure supply line concentrically mounted in the conduit being shown in elevation.

Fig. 3 is a fragmentary view in central section of the upper end of the discharge conduit showing particularly the means for sealing the conduit in relation to a pressure supply line extending therethrough.

Referring more in detail to the drawing:

1 designates a well hole lined with casing 2 having its lower end spaced above rock strata 3 to allow formation of an enlarged pocket 4 for receiving a filter bed 5 of graded gravel or similar material.

Extending downwardly through the casing and resting on the rock strata is a well column or casing 6 including a lower screen section 7, here shown as being formed of concrete.

The upper end of the casing is surrounded by a head 8 of concrete or the like, having a portion projecting above the surface of the ground, cast to form a chamber 9 for a purpose presently described and provided with a lateral opening 10.

Walls 11 and 12 at the lower and upper ends of the chamber surround the upper end of the well column projecting above the casing and serve respectively to close the upper end of the casing and to provide a support for a pump base 13 resting thereon and sealing the top of the well column.

A motor 14, mounted on the base, is operably connected with a pump 15 secured to the lower end of tubing 16 extending downwardly through the well column for forcing liquid from the well through the tubing into a discharge line 17 provided with a control valve 18.

The apparatus thus far described does not constitute a part of the present invention, but operates in a well known manner to draw liquid, filtering through the gravel bed and screen section 7 into the well column, from the well.

In order to remove the sand, silt, etc., carried by the liquid through the filter bed toward the well column from the well, a discharge conduit 19 is extended downwardly into the well to the rock strata and is preferably positioned adjacent the well column.

The lower end of the conduit is perforated as shown at 20 and is preferably provided with a spider 21 for receiving a screen section 22 connected by a coupling 23 to the lower end of a pressure supply line 24 extended concentrically through the discharge conduit.

Threaded on the upper end of the conduit is a fitting 25, preferably of the Y-branch type, its upper branch being sealingly engaged with the pressure line by suitable packing means indicated at 26 and its angular branch being connected by an elbow 27 to a lateral section 28 of the discharge conduit extended through an opening 29 of the well head.

An elbow 30 and lateral section 31 are also provided on the pressure line and valves 32 and 33 are interposed respectively in the pressure line and discharge conduit to control flow of fluid through the lines.

As is shown in Fig. 1, the valve 32 is preferably located in the chamber 9 of the head, and access to this valve and to the fittings at the upper end of the pressure line may be had through the lateral opening 10.

Assuming a well of the type described to be equipped with filter cleaning apparatus constructed in accordance with my invention, the process of cleaning the filter bed is as follows:

The motor is connected with a suitable source of energy for actuating the pump to deliver liquid from the well through the discharge conduit, and the valves in the pressure supply line and discharge conduit of the air lift are maintained in closed condition.

As soon as a material decrease is noted in the capacity of the well, the valve in the pressure supply line is opened and pressure medium, such as air is delivered into the well through the line and is expelled through the screen section 22 into the discharge conduit.

After a pressure of from 40 to 150 pounds, depending upon the depth of the well, has been built up in the well and has loosened the layer of silt and driven some of the finer particles radially away from the well column through the interstices of the filter bed, the valve 33 is opened and the pressure, built up in the well, carries liquid, laden with silt and sand, from the well through the discharge conduit 19 and creates a suction in the filter bed which tends to draw the more remote silt particles toward the mouth of the discharge line.

This process is continued until the filter bed has again become sufficiently porous to allow free flow of liquid to the main discharge line and is repeated as often as required to maintain a free flow through the filter bed.

Since the silt-laden liquid is carried from the well through a line independent of the main discharge conduit, the liquid in the well will remain substantially clear.

What I claim and desire to secure by Letters Patent is:

1. In combination with a well including a filter bed and a casing having an apertured portion extending into the filter bed, means for removing detritus from said filter bed and the apertures in said casing including a detritus discharge conduit extending into the filter bed and terminating adjacent said apertured portion of the well casing, a valve in said conduit for closing flow through the conduit, a pipe associated with the conduit for supplying air pressure to said filter bed externally of said casing, and a valve in said air pipe for controlling flow of air to said filter bed to dislodge said detritus from the filter bed and the apertured portion of the casing when the first named valve is closed and to effect flow of the loosened detritus through said conduit when the valve in said conduit is opened to relieve said air pressure.

2. In combination with a well including a filter bed and a casing having an apertured portion extending into the filter bed, means for removing detritus from said filter bed and the apertured portion of the casing, a detritus discharge conduit extending into the filter bed and terminating adjacent said apertured portion of the well casing, a valve in said conduit, a pressure supply pipe extending within said conduit and having a screen section located adjacent the terminus of the conduit, and a valve in said pipe for controlling flow of pressure medium through said pipe for establishing pressure in said filter bed to dislodge detritus from and around the perforated portion of the casing and for effecting flow of said detritus through said conduit when the valve in the conduit is opened.

3. In combination with a well including a filter bed, a casing extending into said filter bed for containing a filtering material to be supplied to the filter bed, an inner casing extending longitudinally of the first named casing and having a perforated portion located in said filter bed, a detritus discharge conduit extending through the first named casing alongside the inner casing and having a perforated portion located adjacent the perforated portion of the inner casing, a valve in said conduit, an air supply pipe associated with said conduit for supplying air pressure to said filter bed for dislodging detritus from the filter bed and around said apertured portion of the casing when the conduit valve is closed and to effect flow of said detritus through said conduit when the conduit valve is open to relieve said air pressure so that additional filtering material is admitted to said filter bed.

4. In combination with a well including a filter bed, an outer casing extending to the filter bed, an inner casing extending concentrically within the outer casing and having an apertured portion located in said filter bed, a tubing extending longitudinally within the inner casing through which fluid is discharged from the well, a valve in said tubing for shutting off flow through the tubing, a detritus discharge conduit extending between the inner and outer casings and having a perforated portion located adjacent the perforated portion of the inner casing, a valve in said conduit, means associated with said conduit for supplying pressure medium to said filter bed to loosen detritus from the filter bed and from around the apertured portion of the inner casing and to effect flow of said loosened detritus through said conduit when the conduit and tubing valves are closed.

PHILIP S. JUDY.